United States Patent
Tanabe et al.

(10) Patent No.: US 10,669,409 B2
(45) Date of Patent: Jun. 2, 2020

(54) RUBBER COMPOSITION AND PNEUMATIC TIRE INCLUDING THE SAME

(71) Applicant: THE YOKOHAMA RUBBER CO., LTD., Minato-ku, Tokyo (JP)

(72) Inventors: Yusuke Tanabe, Hiratsuka (JP); Shun Sato, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/320,894

(22) PCT Filed: Jun. 24, 2015

(86) PCT No.: PCT/JP2015/068169
§ 371 (c)(1),
(2) Date: Dec. 21, 2016

(87) PCT Pub. No.: WO2015/199123
PCT Pub. Date: Dec. 30, 2015

(65) Prior Publication Data
US 2017/0158846 A1 Jun. 8, 2017

(30) Foreign Application Priority Data

Jun. 27, 2014 (JP) .................................. 2014-133001
Jun. 27, 2014 (JP) .................................. 2014-133119

(51) Int. Cl.
*C08L 9/08* (2006.01)
*C08K 5/54* (2006.01)
*B60C 1/00* (2006.01)
*C08L 23/26* (2006.01)
*C08L 9/06* (2006.01)
*C08K 3/36* (2006.01)
*C08L 9/00* (2006.01)

(52) U.S. Cl.
CPC ..................... *C08L 9/08* (2013.01);
*B60C 1/00* (2013.01); *B60C 1/0016* (2013.01);
*C08K 3/36* (2013.01); *C08K 5/54* (2013.01);
*C08L 9/00* (2013.01); *C08L 9/06* (2013.01);
*C08L 23/26* (2013.01); *C08L 2205/02* (2013.01); *C08L 2205/03* (2013.01)

(58) Field of Classification Search
CPC .... C08L 9/08; C08L 23/26; C08L 9/00; C08L 2205/02; B60C 1/00; C08K 5/54
USPC ......................................................... 523/156
See application file for complete search history.

(56) References Cited

U.S. PATENT DOCUMENTS 6,602,954 B1  8/2003  Lin
6,774,185 B2 * 8/2004  Lin .......................... C08K 3/22
                                                    525/191

FOREIGN PATENT DOCUMENTS

| AU | A-97191/98 | * | 7/1999 |
| JP | 2010-059248 A | | 3/2010 |
| JP | 2010-235685 A | | 10/2010 |
| JP | 2011-153168 A | | 8/2011 |
| JP | 2011-190412 A | | 9/2011 |
| KR | 10-2012-0066790 A | | 6/2012 |
| KR | 2012-0066790 A | | 6/2012 |

OTHER PUBLICATIONS

Extended European search report issued in the corresponding EP Patent Application 15812048.5, and first became known to applicant Nov. 13, 2017.

* cited by examiner

*Primary Examiner* — Doris L Lee
(74) *Attorney, Agent, or Firm* — Carrier Blackman & Associates, P.C.; Joseph P. Carrier; Anne G. Sabourin

(57) ABSTRACT

A rubber composition includes a diene rubber (A), a silica (B), a silane coupling agent (C), and an acid-modified polyolefin (D); the diene rubber (A) containing not less than 30 mass % of an aromatic vinyl-conjugated diene copolymer rubber; the acid-modified polyolefin (D) having at least one type of repeating unit selected from the group consisting of propylene, 1-butene, and 1-octene; a content of the silica (B) being from 5 to 150 parts by mass per 100 parts by mass of the diene rubber (A); and a total content of the silane coupling agent (C) and the acid-modified polyolefin being from 5 to 30 parts by mass per 100 parts by mass of the diene rubber (A). Such rubber composition is capable of achieving both excellent vulcanization properties and low heat build-up. A pneumatic tire includes such rubber composition.

4 Claims, 1 Drawing Sheet

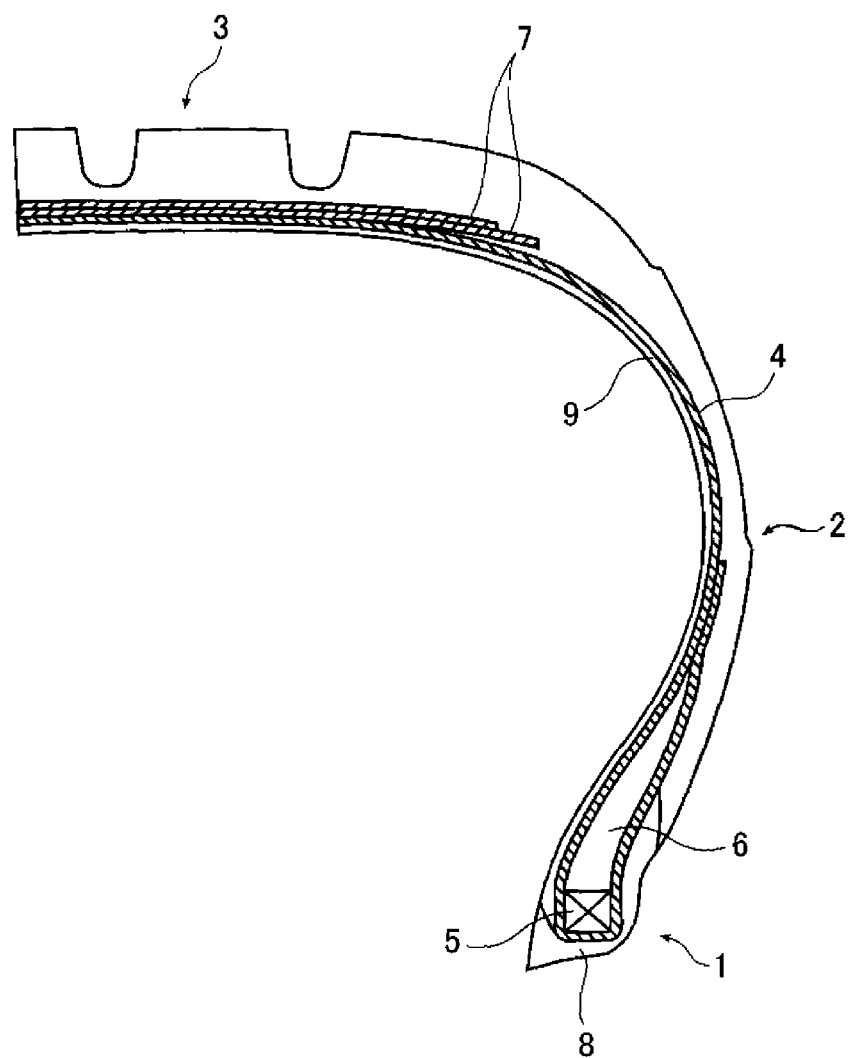

RUBBER COMPOSITION AND PNEUMATIC TIRE INCLUDING THE SAME

TECHNICAL FIELD

The present invention relates to a rubber composition and a pneumatic tire using the same.

BACKGROUND ART

In recent years, there has been a demand for environmental consideration with regard to even pneumatic tires from the perspective of protecting the global environment. Specifically, there has been a demand for performance which enhances fuel economy while maintaining high strength.

In order to improve fuel economy, a pneumatic tire should be produced using a rubber composition capable of suppressing heat build-up during travel. In particular, it is thought that fuel economy can be improved by reducing the heat build-up in treads, which are in contact with the road surface during travel, and sidewalls, which repeatedly undergo substantial deformation during travel.

In Patent Document 1, with the objective of achieving low heat build-up while maintaining hardness and modulus and imparting high breaking elongation, the present applicant provides "a rubber composition for a tire produced by blending from 1 to 80 parts by mass of a regenerated polyethylene terephthalate powder into 100 parts by mass of at least one type of a diene rubber selected from the group consisting of natural rubbers, butadiene rubbers, styrene-butadiene copolymer rubbers, isoprene rubbers, and ethylene-propylene-diene terpolymers" ([Claim 1], [0005]) and proposes "to blend from 1 to 30 parts by mass of a carboxyl group or an anhydrous carboxyl group-containing polyethylene into 100 parts by mass of a diene rubber" from the perspective of further enhancing the aforementioned objective (effect) ([Claim 2] [0007]).

CITATION LIST

Patent Literature

Patent Document 1: Japanese Unexamined Patent Application Publication No. 2011-153168A

SUMMARY OF INVENTION

Technical Problem

When investigating the rubber composition for tires described in Patent Document 1, the present inventors determined that it may not be possible to achieve both low heat build-up and vulcanization properties such as hardness, modulus, and breaking elongation with a system that does not contain a regenerated polyethylene terephthalate powder or depending on the type of the diene rubber.

Therefore, an object of the present invention is to provide a rubber composition capable of achieving both excellent vulcanization properties and low heat build-up, and a pneumatic tire using the same.

SUMMARY OF INVENTION

As a result of conducting dedicated research in order to solve the problem described above, the present inventors discovered that a rubber composition containing a diene rubber comprising a prescribed amount of an aromatic vinyl-conjugated diene copolymer rubber, a silica, a silane coupling agent, and a specific acid-modified polyolefin can achieve both excellent vulcanization performance and low heat build-up, and the present inventors thereby completed the present invention.

Specifically, the inventor discovered that the problem described above can be solved by the following features.

[1] A rubber composition containing a diene rubber (A), a silica (B), a silane coupling agent (C), and an acid-modified polyolefin (D);

the diene rubber (A) containing not less than 30 mass % of an aromatic vinyl-conjugated diene copolymer rubber;

the acid-modified polyolefin (D) having at least one type of repeating unit selected from the group consisting of propylene, 1-butene, and 1-octene;

a content of the silica (B) being from 5 to 150 parts by mass per 100 parts by mass of the diene rubber (A);

a content of each of the silane coupling agent (C) and the acid-modified polyolefin (D) being not less than 1 part by mass per 100 parts by mass of the diene rubber (A); and a total content of the silane coupling agent (C) and the acid-modified polyolefin being from 5 to 30 parts by mass per 100 parts by mass of the diene rubber (A).

[2] The rubber composition according to [1], wherein the acid-modified polyolefin (D) is a copolymer of: one type of repeating unit selected from the group consisting of propylene, 1-butene, and 1-octene; and one type of repeating unit selected from the group consisting of ethylene, propylene, 1-butene, and 1-octene.

[3] The rubber composition according to [1] or [2], wherein the silica (B) and the acid-modified polyolefin (D) are contained as a mixture (E) prepared by mixing the silica (B) and the acid-modified polyolefin (D) in an advance.

[4] The rubber composition according to [3], wherein a mass ratio of the acid-modified polyolefin (D) to the silica (B) in the mixture (E) is from 100:5 to 100:60.

[5] The rubber composition according to [3] or [4], wherein a content of the mixture (E) is from 3 to 30 parts by mass per 100 parts by mass of the diene rubber (A).

[6] The rubber composition according to any one of [3] to [5], wherein at least a part of the silica (B) in the mixture (E) bonds to an acid-modified site of the acid-modified polyolefin (D).

[7] The rubber composition according to any one of [1] to [6], wherein the acid-modified polyolefin (D) is a polyolefin modified with maleic anhydride.

[8] A pneumatic tire including the rubber composition according to any one of [1] to [7] in a structural member thereof.

Advantageous Effects of Invention

With the present invention, it is possible to provide a rubber composition capable of achieving both excellent vulcanization properties and low heat build-up, and a pneumatic tire including such a rubber composition.

BRIEF DESCRIPTION OF DRAWING

FIG. 1 is a partial cross-sectional view of a tire that illustrates one embodiment of a pneumatic tire of the present invention.

DESCRIPTION OF EMBODIMENT

Rubber Composition

The rubber composition of the present invention is a rubber composition containing a diene rubber (A), a silica (B), a silane coupling agent (C), and an acid-modified polyolefin (D); the diene rubber (A) containing not less than 30 mass % of an aromatic vinyl-conjugated diene copolymer rubber; and the acid-modified polyolefin (D) having at least one type of a repeating unit selected from the group consisting of propylene, 1-butene, and 1-octene.

In addition, the content of the silica (B) is from 5 to 150 parts by mass per 100 parts by mass of the diene rubber (A).

Furthermore, the content of each of the silane coupling agent (C) and the acid-modified polyolefin (D) is not less than 1 part by mass per 100 parts by mass of the diene rubber (A), and the total content of the silane coupling agent (C) and the acid-modified polyolefin (D) is from 5 to 30 parts by mass per 100 parts by mass of the diene rubber (A).

In the present invention, it is possible to achieve both excellent vulcanization properties and low heat build-up by containing a specific acid-modified polyolefin (D) in addition to a silica and a silane coupling agent in a diene rubber containing not less than 30 mass % of an aromatic vinyl-conjugated diene copolymer rubber.

Although the reason is not clear in detail, it is assumed to be as follows.

Specifically, an acid-modified polyolefin having specific repeating units is considered to have higher affinity with silica due to the presence of an acid-modified group (for example, a maleic anhydride group), which is thought to contribute to the dispersion of the silane coupling agent as well as the silica. Furthermore, the polyolefin site is hydrophobic, which is thought to yield excellent physical interaction with the rubber.

In addition, taking into consideration that this effect is not expressed when an acid-modified polyolefin having only ethylene as a repeating unit (called "acid-modified polyolefin" hereafter) is blended, as illustrated in Comparative Example 7 described below, the tertiary carbon of the repeating unit selected from propylene, 1-butene, and 1-octene is considered essential to the enhancement of the vulcanization properties induced by physical interaction with the rubber.

The components contained in the rubber composition of the present invention will now be explained in detail.

Diene Rubber (A)

The diene rubber (A) contained in the rubber composition of the present invention is not particularly limited as long as the diene rubber (A) at least contains not less than 30 mass % of an aromatic vinyl-conjugated diene copolymer rubber.

Here, the terminals of the aromatic vinyl-conjugated diene copolymer rubber may be modified with a hydroxy group, a polyorganosiloxane group, a carbonyl group, an amino group, or the like.

Examples of the aromatic vinyl-conjugated diene copolymer rubber described above include styrene-butadiene rubber (SBR), styrene-isoprene rubber, styrene-butadiene-isoprene rubber (SBIR), and the like. Of these, SBR is preferable.

Furthermore, the weight average molecular weight of the aromatic vinyl-conjugated diene copolymer rubber is not particularly limited but is preferably from 100,000 to 2,500,000 and more preferably from 300,000 to 2,000,000 from the perspective of processability. Note that the weight average molecular weight (Mw) of the aromatic vinyl-conjugated diene copolymer rubber is measured by gel permeation chromatography (GPC) on the basis of polystyrene standard using tetrahydrofuran as a solvent.

In the present invention, the aromatic vinyl-conjugated diene copolymer rubber is preferably contained in the diene rubber in an amount of from 35 to 100 mass % and more preferably from 40 to 90 mass % from the perspective of ensuring that the low heat build-up can be further enhanced and from the perspective of a balance of low heat build-up and wet grip performance.

In addition, in the present invention, the aromatic vinyl-conjugated diene copolymer rubber preferably contains from 20 to 50 mass % of an aromatic vinyl and contains from 20 to 70 mass % of the vinyl bond content in the conjugated diene from the perspective of processability or wear resistance.

In the present invention, when a diene rubber other than the aromatic vinyl-conjugated diene copolymer rubber described above is contained, the diene rubber is not particularly limited as long as the diene rubber has double bonds in its main chain, and specific examples thereof include natural rubber (NR), isoprene rubber (IR), butadiene rubber (BR), chloroprene rubber (CR), acrylonitrile butadiene rubber (NBR), ethylene-propylene-diene copolymer rubber (EPDM), styrene-isoprene rubber, isoprene-butadiene rubber, nitrile rubber, and hydrogenated nitrile rubber. One type of these may be used alone, or two or more types may be used in combination.

Of these, it is preferable to use NR or BR from the perspective of ensuring good wear resistance and excellent processability.

Silica (B)

The silica (B) contained in the rubber composition of the present invention is not particularly limited, and any conventionally known silica that is blended in rubber compositions for applications such as tires can be used.

Specific examples of the silica (B) include fumed silica, calcined silica, precipitated silica, pulverized silica, molten silica, and colloidal silica. One type of these may be used alone, or two or more types may be used in combination.

In addition, the CTAB adsorption specific surface area of the silica (B) is preferably from 50 to 300 $m^2/g$ and more preferably from 80 to 250 $m^2/g$ from the perspective of suppressing the aggregation of the silica. Note that the CTAB adsorption specific surface area is a value of the amount of n-hexadecyltrimethylammonium bromide adsorbed to the surface of silica measured in accordance with JIS K6217-3:2001 "Part 3: Method for determining specific surface area—CTAB adsorption method."

In the present invention, the content of the silica (B) is from 5 to 150 parts by mass, preferably from 10 to 120 parts by mass, and more preferably from 20 to 100 parts by mass per 100 parts by mass of the diene rubber (A).

Silane Coupling Agent (C)

The silane coupling agent (C) contained in the rubber composition of the present invention is not particularly limited, and any conventionally known silane coupling agent that is blended in rubber compositions for applications such as tires can be used.

Specific examples of the above silane coupling agent (C) include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One type of these may be used alone, or two or more types may be used in combination. In addition, one or two or more types of these may be oligomerized in advanced and used.

Furthermore, specific examples of the silane coupling agent (C) other than those listed above include mercapto-based silane coupling agents such as γ-mercaptopropyltriethoxysilane and 3-[ethoxybis(3,6,9,12,15-pentaoxaoctacosane-1-yloxy)silyl]-1-propanethiol; thiocarboxylate-based silane coupling agents such as 3-octanoylthiopropyltriethoxysilane; and thiocyanate-based silane coupling agents such as 3-thiocyanatepropyltriethoxysilane. One type of these may be used alone, or two or more types may be used in combination. In addition, one or two or more types of these may be oligomerized in advanced and used.

Of these examples, to improve the reinforcing properties of the tire, bis(3-triethoxysilylpropyl)tetrasulfide and/or bis(3-triethoxysilylpropyl)disulfide is preferably used. Specific examples thereof include Si69 (bis(3-triethoxysilylpropyl)tetrasulfide, manufactured by Evonik Degussa), Si75 (bis(3-triethoxysilylpropyl)disulfide, manufactured by Evonik Degussa), and the like.

In the present invention, the content of the silane coupling agent (C) is not less than 1 part by mass and preferably from 1 to 10 parts by mass per 100 parts by mass of the diene rubber (A).

In addition, the content of the silane coupling agent (C) is preferably from 0.1 to 20 parts by mass and more preferably from 0.5 to 15 parts by mass per 100 parts by mass of the silica (B).

Acid-Modified Polyolefin (D)

The acid-modified polyolefin (D) contained in the rubber composition of the present invention is a polyolefin having at least one type of repeating unit selected from the group consisting of propylene, 1-butene, and 1-octene from among modified polymers prepared by modifying polyolefin resins with saturated carboxylic acids.

Here, the polyolefin having the repeating unit described above may be a copolymer having one type of repeating unit selected from the group consisting of ethylene, propylene, 1-butene, and 1-octene as a repeating unit other than the repeating units described above.

Polyolefin

Examples of the polyolefin constituting the backbone of the acid-modified polyolefin (D) include:

homopolymers such as polypropylene, polybutene, and polyoctene;

two-component copolymers such as propylene/ethylene copolymers, propylene/1-butene copolymers, propylene/1-hexene copolymers, propylene/4-methyl-1-pentene copolymers, propylene/1-octene copolymers, propylene/1-decene copolymers, propylene/1,4-hexadiene copolymers, propylene/dicyclopentadiene copolymers, propylene/5-ethylidene-2-norbornene copolymers, propylene/2,5-norbornadiene copolymers, propylene/5-ethylidene-2-norbornene copolymers, 1-octene/ethylene copolymers, 1-butene/ethylene copolymers, 1-butene/propylene copolymers, 1-butene/1-hexene copolymers, 1-butene/4-methyl-1-pentene copolymers, 1-butene/1-octene copolymers, 1-butene/1-decene copolymers, 1 butene/1,4-hexadiene copolymers, 1-butene/dicyclopentadiene copolymers, 1-butene/5-ethylidene-2-norbornene copolymers, 1-butene/2,5-norbornadiene copolymers, and 1-butene/5-ethylidene-2-norbornene copolymers; and multi-component copolymers such as ethylene/propylene/1-butene copolymers, ethylene/propylene/1-hexene copolymers, ethylene/propylene/1-octene copolymers, ethylene/propylene/1,4-hexadiene copolymers, ethylene/propylene/dicyclopentadiene copolymers, ethylene/propylene/5-ethylidene-2-norbornene copolymers, ethylene/propylene/2,5-norbornadiene copolymers, ethylene/propylene/5-ethylidene-2-norbornene copolymers, 1-butene/ethylene/propylene copolymers, 1-butene/ethylene/1-hexene copolymers, 1-butene/ethylene/1-octene copolymers, 1-butene/propylene/1-octene copolymers, 1-butene/ethylene/1,4-hexadiene copolymers, 1-butene/propylene/1,4-hexadiene copolymers, 1-butene/ethylene/dicyclopentadiene copolymers, 1-butene/propylene/dicyclopentadiene copolymers, 1-butene/ethylene/5-ethylidene-2-norbornene copolymers, 1-butene/propylene/5-ethylidene-2-norbornene copolymers, 1-butene/ethylene/2,5-norbornadiene copolymers, 1-butene/propylene/2,5-norbornadiene copolymers, 1-butene/ethylene/5-ethylidene-2-norbornene copolymers, and 1-butene/propylene/5-ethylidene-2-norbornene copolymers.

Of these, it is preferable to use polypropylene, polybutene, polyoctene, propylene/ethylene copolymers, 1-butene/ethylene copolymers, 1-butene/propylene copolymers, ethylene/propylene/1-butene copolymers, and 1-octene/ethylene copolymers.

Unsaturated Carboxylic Acid

On the other hand, examples of the unsaturated carboxylic acid which modifies the polyolefin described above include maleic acid, fumaric acid, acrylic acid, crotonic acid, methacrylic acid, itaconic acid, and acid anhydrides of each of these acids.

Of these, it is preferable to use maleic anhydride, maleic acid, and acrylic acid.

The acid-modified polyolefin (D) described above may be produced with a conventionally used method such as a method of graft-polymerizing an unsaturated carboxylic acid with the polyolefin described above under conventionally used conditions such as stirring while heating, and a commercially available product may also be used.

Examples of commercially available products include maleic acid-modified propylene/ethylene copolymers such as Tafmer MA851 (manufactured by Mitsui Chemicals, Inc.) and MP0620 (manufactured by Mitsui Chemicals, Inc.); maleic acid-modified ethylene/1-butene copolymers such as Tafmer MH7020 (manufactured by Mitsui Chemicals, Inc.); and maleic acid-modified polypropylenes such as Admer QE060 (manufactured by Mitsui Chemicals, Inc.).

In the present invention, the content of the acid-modified polyolefin (D) is not less than 1 part by mass and preferably from 1 to 20 parts by mass per 100 parts by mass of the diene rubber (A).

In addition, the content of the acid-modified polyolefin (D) is preferably from 0.1 to 30 parts by mass and more preferably from 0.2 to 25 parts by mass per 100 parts by mass of the silica (B).

Furthermore, in the present invention, the total content of the silane coupling agent (C) and the acid-modified polyolefin (D) described above is from 5 to 30 parts by mass, preferably from 6 to 29 parts by mass, and more preferably from 7 to 28 parts by mass per 100 parts by mass of the diene rubber (A).

Mixture (E)

The rubber composition of the present invention preferably contains the silica (B) and the acid-modified polyolefin (D) described as a mixture prepared by mixing these components in advance since this makes it possible to achieve excellent vulcanization properties and low heat build-up at a higher level.

Although the reason is not clear in detail, it is assumed to be as follows.

That is, the acid-modified polyolefin (D) is thought to have higher affinity with the silica (B) due to the presence of an acid-modified group (for example, a maleic anhydride group), but mixing these components in advance is thought to allow all or most of the acid-modified groups to bond with the silica surface.

In the present invention, the mass ratio (D:B) of the acid-modified polyolefin (D) to the silica (B) in the mixture (E) is preferably from 100:5 to 100:60, more preferably from 100:10 to 100:50, and even more preferably from 100:20 to 100:40.

In addition, in the present invention, the content of the mixture (E) is preferably from 3 to 30 parts by mass, more preferably from 4 to 27 parts by mass, and even more preferably from 5 to 24 parts by mass per 100 parts by mass of the diene rubber (A).

Furthermore, in the present invention, it is preferable for at least part of the silica (B) in the mixture (E) to bond to the acid-modified sites of the acid-modified polyolefin (D) in that the low heat build-up can be further achieved and in that the toughness is also superior.

Here, a "bond" refers to a concept including not only covalent bonds such as silyl ester bonds produced as a result of a reaction between hydroxyl groups present on the surface of the silica (B) and the acid-modified sites of the acid-modified polyolefin (D) (for example, maleic anhydride groups, ring-opened carboxy maleate groups, or the like), but also hydrogen bonds or ionic bonds.

In addition, this bond can be confirmed, for example, by spectral analysis by means of infrared spectroscopy (IR) of the C=O stretching vibration peaks of the acid-modified polyolefin (D) before and after mixing.

The method of mixing the acid-modified polyolefin (D) and the silica (B) described is not particularly limited, and an example thereof is a method of kneading these components using a publicly known method and device (for example, a Banbury mixer, kneader, roll, or the like).

Carbon Black

The rubber composition of the present invention preferably contains a carbon black.

Specific examples of the carbon black are furnace carbon blacks such as SAF, ISAF, HAF, FEF, GPE, and SRF, and one of these can be used alone, or a combination of two or more can be used.

Moreover, the carbon black is preferably one having a nitrogen specific surface area ($N_2SA$) of from 10 to 300 $m^2/g$ and more preferably from 20 to 200 $m^2/g$ from the perspective of processability when the rubber composition is mixed.

Note that the $N_2SA$ is a value of the amount of nitrogen adsorbed to the surface of carbon black, measured in accordance with JIS K6217-2:2001, "Part 2: Determination of specific surface area—Nitrogen adsorption methods—Single-point procedures".

The content when the carbon black described above is contained is preferably from 1 to 100 parts by mass and more preferably from 5 to 80 parts by mass per 100 parts by mass of the diene rubber (A).

Other Components

The rubber composition of the present invention may contain, in addition to the components described above, various other additives typically used in rubber compositions for tires including: a filler such as calcium carbonate; a chemical foaming agent such as a hollow polymer; a vulcanizing agent such as sulfur; a sulfenamide-based, guanidine-based, thiazole-based, thiourea-based, or thiuram-based vulcanization accelerator; a vulcanization accelerator aid, such as zinc oxide and stearic acid; wax; aroma oil, an amine-based anti-aging agent such as paraphenylene diamines (for example, N,N'-di-2-naphthyl-p-phenylenediamine, N-1,3-dimethylbutyl-N'-phenyl-p-phenylenediamine, or the like), ketone-amine condensates (for example, 2,2,4-trimethyl-1,2-dihydroquinoline or the like); a plasticizer; and the like.

The compounded amount of these additives may be any conventional amount, as long as the object of the present invention is not impaired. For example, per 100 parts by mass of the diene rubber (A), from 0.5 to 5 parts by mass of sulfur, from 0.1 to 5 parts by mass of a vulcanization accelerator, from 0.1 to 10 parts by mass of a vulcanization accelerator aid, from 0.5 to 5 parts by mass of an anti-aging agent, from 1 to 10 parts by mass of a wax, and from 5 to 30 parts by mass of an aroma oil may be compounded.

Method for Producing Rubber Composition

There are no particular restrictions to the method for producing the rubber composition of the present invention, and an example is the method whereby each of the above-mentioned components is kneaded using a publicly known method and device (such as a Banbury mixer, kneader, or roll).

In addition, the rubber composition of the present invention can be vulcanized or crosslinked under conventional, publicly known vulcanizing or crosslinking conditions.

Pneumatic Tire

The pneumatic tire of the present invention (also simply called the "tire of the present invention" hereafter) is a pneumatic tire using the rubber composition of the present invention described above in a structural (rubber) member thereof.

Here, the structural member using the rubber composition of the present invention is not particularly limited, but examples include a tire tread portion, a sidewall portion, a bead portion, a member for covering a belt layer, a member for covering a carcass layer, and an inner liner. Of these, a tire tread portion is preferable.

FIG. 1 is a schematic cross-sectional view of a tire that represents an embodiment of the tire of the present invention, but the tire of the present invention is not limited to the embodiment illustrated in FIG. 1.

In FIG. 1, reference numeral 1 represents a bead portion, reference numeral 2 represents a side wall portion, and reference numeral 3 represents a tread portion formed from the rubber composition of the present invention.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

In addition, an inner liner 9 is provided on the inside surface of the pneumatic tire in order to prevent the air filling the inside of the tire from leaking to the outside of the tire.

The tire of the present invention can achieve both excellent vulcanization properties and low heat build-up when the rubber composition of the present invention is used in a tire tread portion.

In addition, the tire of the present invention can be produced by, for instance, forming a tire tread portion by vulcanization or crosslinking at a temperature corresponding to the type and compounding ratio of the diene rubber, vulcanizing agent or crosslinking agent, and vulcanization or crosslinking accelerator used in the rubber composition of the present invention.

EXAMPLES

The present invention will now be described in greater detail using examples. However, the present invention is in no way limited to these examples.

Working Examples 1 to 11 and Comparative Examples 1 and 14

The components shown in Tables 1 to 4 below were blended in the proportions (parts by mass) shown in Tables 1 to 4 below.

Specifically, a master batch was obtained by first kneading the components shown in Tables 1 to 4 below, except for the sulfur and the vulcanization accelerator, for 5 minutes in a 1.7 liter sealed mixer, and then discharging the kneaded product when the temperature reached 150° C.

A rubber composition was obtained by kneading the sulfur and the vulcanization accelerator with the obtained master batch using an open roll.

A vulcanized rubber sheet was then produced by vulcanizing the obtained rubber composition for 20 minutes at 160° C. in a mold for Lambourn abrasion (disk having a diameter of 63.5 mm and a thickness of 5 mm).

Hardness

For the vulcanized rubber sheet that was produced, the durometer hardness (type A) was measured and evaluated at 20° C. in accordance with JIS K6253-3:2012.

The measurement results were shown in Tables 1 to 4 as follows: the results in Table 1 were expressed with the value of Comparative Example 1 defined as an index value of 100; the results in Table 2 were expressed with the value of Comparative Example 8 defined as an index value of 100; the results in Table 3 were expressed with the value of Comparative Example 9 defined as an index value of 100; and the results in Table 4 were expressed with the value of Comparative Example 14 defined as an index value of 100.

Prescribed Elongation Tensile Stress ($S_e$): (Indicator of Modulus)

JIS No. 3 dumbbell-shaped test pieces were punched out of the produced vulcanized rubber sheets, and tensile tests were conducted in accordance with JIS K6251:2010 at a tensile test speed of 500 mm/minute. The elongation at break ($E_B$) [%] was measured at room temperature.

The tensile stress at 100% elongation (100% modulus, abbreviated as "M100" hereafter) and the tensile stress at 300% elongation (300% modulus, abbreviated as "M300" hereafter) were measured.

The measurement results were shown in Tables 1 to 4 as follows: the results in Table 1 were expressed with the value of Comparative Example 1 defined as an index value of 100; the results in Table 2 were expressed with the value of Comparative Example 8 defined as an index value of 100; the results in Table 3 were expressed with the value of Comparative Example 9 defined as an index value of 100; and the results in Table 4 were expressed with the value of Comparative Example 14 defined as an index value of 100. Larger index values indicate greater stress and a higher modulus.

Elongation at Break ($E_B$): (Indicator of Breaking Elongation)

JIS No. 3 dumbbell-shaped test pieces were punched out of the produced vulcanized rubber sheets, and tensile tests were conducted in accordance with JIS K6251:2010 at a tensile test speed of 500 mm/minute. The elongation at break ($E_B$) was measured at room temperature.

The measurement results were shown in Tables 1 to 4 as follows: the results in Table 1 were expressed with the value of Comparative Example 1 defined as an index value of 100; the results in Table 2 were expressed with the value of Comparative Example 8 defined as an index value of 100; the results in Table 3 were expressed with the value of Comparative Example 9 defined as an index value of 100; and the results in Table 4 were expressed with the value of Comparative Example 14 defined as an index value of 100. Larger index value indicate superior breaking elongation.

Impact Resilience (60°)

The impact resilience of the produced vulcanized rubber sheets at a temperature of 60° C. was measured in accordance with JIS K6255:2013.

The measurement results were shown in Tables 1 to 4 as follows: the results in Table 1 were expressed with the value of Comparative Example 1 defined as an index value of 100; the results in Table 2 were expressed with the value of Comparative Example 8 defined as an index value of 100; the results in Table 3 were expressed with the value of Comparative Example 9 defined as an index value of 100; and the results in Table 4 were expressed with the value of Comparative Example 14 defined as an index value of 100. Larger index values indicate superior impact resilience.

tan δ (60° C.)

The value of the loss tangent tan δ (60° C.) was measured for the produced vulcanized rubber sheet with an elongation deformation distortion of 10±2%, an oscillation frequency of 20 Hz, and a temperature of 60° C. using a viscoelastic spectrometer (manufactured by Iwamoto Manufacturing).

The measurement results were shown in Tables 1 to 4 as follows: the results in Table 1 were expressed with the value of Comparative Example 1 defined as an index value of 100; the results in Table 2 were expressed with the value of Comparative Example 8 defined as an index value of 100; the results in Table 3 were expressed with the value of Comparative Example 9 defined as an index value of 100; and the results in Table 4 were expressed with the value of Comparative Example 14 defined as an index value of 100. Larger index values indicate superior low heat build-up.

TABLE 1

|  | Comparative Examples | | | Working Example | Comparative Example |
|---|---|---|---|---|---|
|  | 1 | 2 | 3 | 1 | 4 |
| E-SBR | 80 | 80 | 80 | 80 | 80 |
| BR | 20 | 20 | 20 | 20 | 20 |

TABLE 1-continued

| | | | | | |
|---|---|---|---|---|---|
| Acid-modified polyolefin 1 | | 2 | 5 | 4 | 15 |
| Acid-modified polyolefin 2 | | | | | |
| Acid-modified polyolefin 3 | | | | | |
| Silane coupling agent | 1 | 1 | | 1 | |
| Silica | 80 | 80 | 80 | 80 | 80 |
| Carbon black | 5 | 5 | 5 | 5 | 5 |
| Zinc oxide | 3 | 3 | 3 | 3 | 3 |
| Stearic acid | 1 | 1 | 1 | 1 | 1 |
| Anti-aging agent | 1 | 1 | 1 | 1 | 1 |
| Oil | 6 | 6 | 6 | 6 | 6 |
| Sulfur | 2 | 2 | 2 | 2 | 2 |
| Sulfur-containing vulcanization accelerator (CZ) | 1 | 1 | 1 | 1 | 1 |
| Vulcanization accelerator (DPG) | 0.5 | 0.5 | 0.5 | 0.5 | 0.5 |
| Hardness (20° C.) | 100 | 101 | 102 | 104 | 106 |
| M100 | 100 | 102 | 98 | 107 | 104 |
| M300 | 100 | 100 | 94 | 103 | 97 |
| EB (elongation at break) | 100 | 100 | 101 | 106 | 96 |
| Impact resilience (60° C.) | 100 | 102 | 104 | 107 | 110 |
| tanδ (60° C.) | 100 | 101 | 97 | 96 | 92 |

| | Working Example 2 | Comparative Example 5 | Working Example 3 |
|---|---|---|---|
| E-SBR | 80 | 80 | 80 |
| BR | 20 | 20 | 20 |
| Acid-modified polyolefin 1 | 14 | 30 | 29 |
| Acid-modified polyolefin 2 | | | |
| Acid-modified polyolefin 3 | | | |
| Silane coupling agent | 1 | | 1 |
| Silica | 80 | 80 | 80 |
| Carbon black | 5 | 5 | 5 |
| Zinc oxide | 3 | 3 | 3 |
| Stearic acid | 1 | 1 | 1 |
| Anti-aging agent | 1 | 1 | 1 |
| Oil | 6 | 6 | 6 |
| Sulfur | 2 | 2 | 2 |
| Sulfur-containing vulcanization accelerator (CZ) | 1 | 1 | 1 |
| Vulcanization accelerator (DPG) | 0.5 | 0.5 | 0.5 |
| Hardness (20° C.) | 113 | 115 | 121 |
| M100 | 111 | 112 | 119 |
| M300 | 105 | 103 | 104 |
| EB (elongation at break) | 112 | 90 | 125 |
| Impact resilience (60° C.) | 115 | 114 | 127 |
| tanδ (60° C.) | 82 | 80 | 65 |

| | Comparative Example 6 | Working Example 4 | Comparative Example 7 |
|---|---|---|---|
| E-SBR | 80 | 80 | 80 |
| BR | 20 | 20 | 20 |
| Acid-modified polyolefin 1 | 39 | | |
| Acid-modified polyolefin 2 | | 14 | |
| Acid-modified polyolefin 3 | | | 14 |
| Silane coupling agent | 1 | 1 | 1 |
| Silica | 80 | 80 | 80 |
| Carbon black | 5 | 5 | 5 |
| Zinc oxide | 3 | 3 | 3 |
| Stearic acid | 1 | 1 | 1 |
| Anti-aging agent | 1 | 1 | 1 |
| Oil | 6 | 6 | 6 |
| Sulfur | 2 | 2 | 2 |
| Sulfur-containing vulcanization accelerator (CZ) | 1 | 1 | 1 |
| Vulcanization accelerator (DPG) | 0.5 | 0.5 | 0.5 |
| Hardness (20° C.) | 125 | 114 | 102 |
| M100 | 124 | 112 | 103 |
| M300 | 94 | 104 | 96 |
| EB (elongation at break) | 116 | 113 | 101 |
| Impact resilience (60° C.) | 135 | 116 | 103 |
| tanδ (60° C.) | 62 | 81 | 94 |

TABLE 2

| | Comparative Examples | | | Comparative Example 3 |
|---|---|---|---|---|
| | 8 | 9 | 10 | |
| E-SBR | 80 | 80 | 80 | 80 |
| BR | 20 | 20 | 20 | 20 |
| Acid-modified polyolefin 1 | | | 1 | 5 |
| Silane coupling agent | 3 | 5 | 3 | |
| Silica | 80 | 80 | 80 | 80 |
| Carbon black | 5 | 5 | 5 | 5 |
| Zinc oxide | 3 | 3 | 3 | 3 |
| Stearic acid | 1 | 1 | 1 | 1 |
| Anti-aging agent | 1 | 1 | 1 | 1 |
| Oil | 6 | 6 | 6 | 6 |
| Sulfur | 2 | 2 | 2 | 2 |
| Sulfur-containing vulcanization accelerator (CZ) | 1 | 1 | 1 | 1 |
| Vulcanization accelerator (DPG) | 0.5 | 0.5 | 0.5 | 0.5 |
| Hardness (20° C.) | 100 | 104 | 100 | 100 |
| M100 | 100 | 112 | 102 | 82 |
| M300 | 100 | 110 | 99 | 77 |
| EB (elongation at break) | 100 | 95 | 99 | 102 |
| Impact resilience (60° C.) | 100 | 97 | 101 | 103 |
| tanδ (60° C.) | 100 | 99 | 99 | 96 |

| | Working Example 5 | Comparative Example 4 | Working Example 6 |
|---|---|---|---|
| E-SBR | 80 | 80 | 80 |
| BR | 20 | 20 | 20 |
| Acid-modified polyolefin 1 | 2 | 15 | 12 |
| Silane coupling agent | 3 | | 3 |
| Silica | 80 | 80 | 80 |
| Carbon black | 5 | 5 | 5 |
| Zinc oxide | 3 | 3 | 3 |
| Stearic acid | 1 | 1 | 1 |
| Anti-aging agent | 1 | 1 | 1 |
| Oil | 6 | 6 | 6 |

TABLE 2-continued

|  |  |  |  |
|---|---|---|---|
| Sulfur | 2 | 2 | 2 |
| Sulfur-containing vulcanization accelerator (CZ) | 1 | 1 | 1 |
| Vulcanization accelerator (DPG) | 0.5 | 0.5 | 0.5 |
| Hardness (20° C.) | 103 | 104 | 111 |
| M100 | 106 | 87 | 108 |
| M300 | 102 | 80 | 104 |
| EB (elongation at break) | 106 | 97 | 110 |
| Impact resilience (60° C.) | 106 | 109 | 113 |
| tanδ (60° C.) | 94 | 91 | 86 |

|  | Comparative Example 5 | Working Example 7 | Comparative Example 11 |
|---|---|---|---|
| E-SBR | 80 | 80 | 80 |
| BR | 20 | 20 | 20 |
| Acid-modified polyolefin 1 | 30 | 27 | 37 |
| Silane coupling agent |  | 3 | 3 |
| Silica | 80 | 80 | 80 |
| Carbon black | 5 | 5 | 5 |
| Zinc oxide | 3 | 3 | 3 |
| Stearic acid | 1 | 1 | 1 |
| Anti-aging agent | 1 | 1 | 1 |
| Oil | 6 | 6 | 6 |
| Sulfur | 2 | 2 | 2 |
| Sulfur-containing vulcanization accelerator (CZ) | 1 | 1 | 1 |
| Vulcanization accelerator (DPG) | 0.5 | 0.5 | 0.5 |
| Hardness (20° C.) | 112 | 119 | 124 |
| M100 | 94 | 124 | 121 |
| M300 | 84 | 103 | 92 |
| EB (elongation at break) | 91 | 120 | 110 |
| Impact resilience (60° C.) | 113 | 128 | 125 |
| tanδ (60° C.) | 79 | 70 | 76 |

TABLE 3

|  | Comparative Examples |  |  |  | Working Example |
|---|---|---|---|---|---|
|  | 9 | 8 | 1 | 12 | 8 |
| E-SBR | 80 | 80 | 80 | 80 | 80 |
| BR | 20 | 20 | 20 | 20 | 20 |
| Acid-modified polyolefin 1 |  |  |  | 7 | 2 |
| Silane coupling agent | 5 | 3 | 1 |  | 5 |
| Silica | 80 | 80 | 80 | 80 | 80 |
| Carbon black | 5 | 5 | 5 | 5 | 5 |
| Zin oxide | 3 | 3 | 3 | 3 | 3 |
| Stearic acid | 1 | 1 | 1 | 1 | 1 |
| Antiaging agent | 1 | 1 | 1 | 1 | 1 |
| Oil | 6 | 6 | 6 | 6 | 6 |
| Sulfur | 2 | 2 | 2 | 2 | 2 |
| Sulfur-containing vulcanization accelerator (CZ) | 1 | 1 | 1 | 1 | 1 |
| Vulcanization accelerator (DPG) | 0.5 | 0.5 | 0.5 | 0.5 | 0.5 |
| Hardness (20° C.) | 100 | 96 | 94 | 106 | 104 |
| M100 | 100 | 89 | 75 | 109 | 107 |
| M300 | 100 | 91 | 75 | 99 | 104 |
| EB (elongation at break) | 100 | 105 | 106 | 92 | 107 |
| Impact resilience (60° C.) | 100 | 103 | 103 | 106 | 106 |
| tanδ (60° C.) | 100 | 101 | 100 | 96 | 95 |

|  | Comparative Example 4 | Working Example 9 | Comparative Example 5 |
|---|---|---|---|
| E-SBR | 80 | 80 | 80 |
| BR | 20 | 20 | 20 |
| Acid-modified polyolefin 1 | 15 | 10 | 30 |
| Silane coupling agent |  | 5 |  |
| Silica | 80 | 80 | 80 |
| Carbon black | 5 | 5 | 5 |
| Zinc oxide | 3 | 3 | 3 |
| Stearic acid | 1 | 1 | 1 |
| Antiaging agent | 1 | 1 | 1 |
| Oil | 6 | 6 | 6 |
| Sulfur | 2 | 2 | 2 |
| Sulfur-containing vulcanization accelerator (CZ) | 1 | 1 | 1 |
| Vulcanization accelerator (DPG) | 0.5 | 0.5 | 0.5 |
| Hardness (20° C.) | 100 | 107 | 108 |
| M100 | 78 | 110 | 84 |
| M300 | 73 | 107 | 76 |
| EB (elongation at break) | 102 | 111 | 95 |
| Impact resilience (60° C.) | 113 | 115 | 117 |
| tanδ (60° C.) | 92 | 88 | 80 |

|  | Working Example 10 | Comparative Example 13 |
|---|---|---|
| E-SBR | 80 | 80 |
| BR | 20 | 20 |
| Acid-modified polyolefin 1 | 25 | 35 |
| Silane coupling agent | 5 | 5 |
| Silica | 80 | 80 |
| Carbon black | 5 | 5 |
| Zinc oxide | 3 | 3 |
| Stearic acid | 1 | 1 |
| Antiaging agent | 1 | 1 |
| Oil | 6 | 6 |
| Sulfur | 2 | 2 |
| Sulfur-containing vulcanization accelerator (CZ) | 1 | 1 |
| Vulcanization accelerator (DPG) | 0.5 | 0.5 |
| Hardness (20° C.) | 125 | 129 |
| M100 | 119 | 123 |
| M300 | 108 | 93 |
| EB (elongation at break) | 120 | 115 |
| Impact resilience (60° C.) | 123 | 122 |
| tanδ (60° C.) | 72 | 69 |

TABLE 4

|  | Comparative Example 14 | Working Example 11 |
|---|---|---|
| E-SBR | 50 | 50 |
| BR | 50 | 50 |
| Acid-modified polyolefin 1 |  | 14 |

TABLE 4-continued

|  | Comparative Example 14 | Working Example 11 |
|---|---|---|
| Silane coupling agent | 1 | 1 |
| Silica | 80 | 80 |
| Carbon black | 5 | 5 |
| Zinc oxide | 3 | 3 |
| Stearic acid | 1 | 1 |
| Anti-aging agent | 1 | 1 |
| Oil | 6 | 6 |
| Sulfur | 2 | 2 |
| Sulfur-containing vulcanization accelerator (CZ) | 1 | 1 |
| Vulcanization accelerator (DPG) | 0.5 | 0.5 |
| Hardness (20° C.) | 100 | 109 |
| M100 | 100 | 114 |
| M300 | 100 | 111 |
| EB (elongation at break) | 100 | 105 |
| Impact resilience (60° C.) | 100 | 103 |
| tanδ (60° C.) | 100 | 92 |

The components listed in Tables 1 to 4 are as described below.

E-SBR: Nipol 1502 (manufactured by Zeon Corporation)
BR: Nipol BR 1220 (manufactured by Nihon Zeon Corp.)
Acid-modified polyolefin 1: maleic anhydride-modified ethylene/1-butene copolymer (Tafmer MH7020, manufactured by Mitsui Chemicals, Inc.)
Acid-modified polyolefin 2: maleic anhydride-modified propylene/ethylene copolymer (Tafmer MP06020, manufactured by Mitsui Chemicals, Inc.)
Acid-modified polyolefin 3: maleic anhydride-modified polyethylene (Modic L502, manufactured by Mitsui Chemicals, Inc.)
Silane coupling agent: Si69 (manufactured by Evonik Degussa)
Silica: wet silica (Nipsil AQ, CTAB adsorption specific surface area: 170 m²/g; manufactured by Japan Silica Corporation)
Carbon black: Show Black N339M (manufactured by Showa Cabot K.K.)
Zinc oxide: Zinc Oxide III (manufactured by Seido Chemical Industry Ltd.)
Stearic acid: stearic acid beads (manufactured by Nippon Oil & Fats Co., Ltd.)
Anti-aging agent: N-(1,3-dimethylbutyl)-N'-phenyl-p-phenylenediamine (Antigen 6C, manufactured by Sumitomo Chemical Co., Ltd.)
Oil: Extract No. 4 S (manufactured by Showa Shell Seikyu K.K.)
Sulfur: oil treatment sulfur (manufactured by Karuizawa Refinery Ltd.)
Sulfur-containing vulcanization accelerator (CZ): N-cyclohexyl-2-benzothiazolyl sulfenamide (Sanceller CM-PO, manufactured by Sanshin Chemical Industry Co., Ltd.)
Vulcanization accelerator (DPG): 1,3-diphenylguanidine (Sanceller D-G, manufactured by Sanshin Chemical Industry Co., Ltd.)

It was determined from the results shown in Tables 1 to 4 above that Working Examples 1 to 11, in which a specific amount of a silane coupling agent and a prescribed acid-modified polyolefin were blended, all exhibited enhanced vulcanization properties such as hardness, modulus, and elongation at break as well as low heat build-up in comparison to the comparative examples used as reference examples in each table.

Working Examples 12 to 17 and Comparative Example 15

(1) Preparation of Mixture E1 (Acid-Modified Polyolefin:Silica=100:5)

First, 360.4 g of a maleic anhydride-modified ethylene/1-butene copolymer (Tafmer MH7020, manufactured by Mitsui Chemicals, Inc.) and 18.0 g of silica (Japan Silica Corporation, Nipsil AQ) were charged into a 0.6 L sealed Banbury mixer. After the mixture was kneaded for 5 minutes at 170° C., the mixture was discharged to the outside of the mixer and cooled at room temperature.

Next, the cooled discharged product was press-vulcanized for 10 minutes at 180° C. in a prescribed mold to prepare a sheet-like mixture E1. A new peak was observed at 1,627 cm$^{-1}$ by IR measurement (transmission).

(2) Preparation of Mixture E2 (Acid-Modified Polyolefin:Silica=100:10)

First, 352.9 g of a maleic anhydride-modified ethylene/1-butene copolymer (Tafmer MH7020, manufactured by Mitsui Chemicals, Inc.) and 35.3 g of silica (Japan Silica Corporation, Nipsil AQ) were charged into a 0.6 L sealed Banbury mixer. After the mixture was kneaded for 5 minutes at 170° C., the mixture was discharged to the outside of the mixer and cooled at room temperature.

Next, the cooled discharged product was press-vulcanized for 10 minutes at 180° C. in a prescribed mold to prepare a sheet-like mixture E2. A new peak was observed at 1,627 cm$^{-1}$ by IR measurement (transmission).

(3) Preparation of Mixture E3 (Acid-Modified Polyolefin:Silica=100:30)

First, 325.6 g of a maleic anhydride-modified ethylene/1-butene copolymer (Tafmer MH7020, manufactured by Mitsui Chemicals, Inc.) and 97.7 g of silica (Japan Silica Corporation, Nipsil AQ) were charged into a 0.6 L sealed Banbury mixer. After the mixture was kneaded for 5 minutes at 170° C., the mixture was discharged to the outside of the mixer and cooled at room temperature.

Next, the cooled discharged product was press-vulcanized for 10 minutes at 180° C. in a prescribed mold to prepare a sheet-like mixture E3. A new peak was observed at 1,627 cm$^{-1}$ by IR measurement (transmission).

(4) Preparation of Mixture E4 (Acid-Modified Polyolefin:Silica=100:60)

First, 292.1 g of a maleic anhydride-modified ethylene/1-butene copolymer (Tafmer MH7020, manufactured by Mitsui Chemicals, Inc.) and 175.2 g of silica (Japan Silica Corporation, Nipsil AQ) were charged into a 0.6 L sealed Banbury mixer. After the mixture was kneaded for 5 minutes at 170° C., the mixture was discharged to the outside of the mixer and cooled at room temperature.

Next, the cooled discharged product was press-vulcanized for 10 minutes at 180° C. in a prescribed mold to prepare a sheet-like mixture E4. A new peak was observed at 1,627 cm$^{-1}$ by IR measurement (transmission).

The components shown in Table 5 below were blended in the proportions (parts by mass) shown in Table 5.

Specifically, a master batch was obtained by first kneading the components shown in Table 5 below, except for the sulfur and the vulcanization accelerator, for 5 minutes in a 1.7 L sealed mixer, and then discharging the kneaded product when the temperature reached 150° C.

A rubber composition was obtained by kneading the sulfur and the vulcanization accelerator with the obtained master batch using an open roll.

A vulcanized rubber sheet was then produced by vulcanizing the obtained rubber composition for 20 minutes at 160° C. in a mold for Lambourn abrasion (disk having a diameter of 63.5 mm and a thickness of 5 mm).

The hardness, tensile stress, elongation at break, impact resilience, and tan δ (60° C.) of the obtained vulcanized rubber sheet was measured by the same methods as those of Working Example 1. These results are listed in Table 5 below.

TABLE 5

|  | Comparative Example | Working Examples | |
|---|---|---|---|
|  | 15 | 12 | 13 |
| SBR | 80 | 80 | 80 |
| BR | 20 | 20 | 20 |
| Mixture E1 |  | 15 |  |
| Mixture E2 |  |  | 15 |
| Mixture E3 |  |  |  |
| Mixture E4 |  |  |  |
| Silane coupling agent | 4 | 4 | 4 |
| Silica | 70 | 69.3 | 68.6 |
| Carbon black | 5 | 5 | 5 |
| Zinc oxide | 3 | 3 | 3 |
| Stearic acid | 1 | 1 | 1 |
| Anti-aging agent | 1 | 1 | 1 |
| Oil | 6 | 6 | 6 |
| Sulfur | 2 | 2 | 2 |
| Sulfur-containing vulcanization accelerator (CZ) | 1 | 1 | 1 |
| Vulcanization accelerator (DPG) | 0.5 | 0.5 | 0.5 |
| Mixture mass ratio (acid-modified polyolefin:silica) | — | 100:5 | 100:10 |
| Hardness (20° C.) | 100 | 114 | 115 |
| M100 | 100 | 112 | 112 |
| M300 | 100 | 106 | 107 |
| EB (elongation at break) | 100 | 107 | 108 |
| Impact resilience (60° C.) | 100 | 116 | 117 |
| tan δ (60° C.) | 100 | 80 | 79 |

|  | Working Examples | | | |
|---|---|---|---|---|
|  | 14 | 15 | 16 | 17 |
| SBR | 80 | 80 | 80 | 80 |
| BR | 20 | 20 | 20 | 20 |
| Mixture E1 |  |  |  |  |
| Mixture E2 |  |  |  |  |
| Mixture E3 | 15 |  | 3 | 30 |
| Mixture E4 |  | 15 |  |  |
| Silane coupling agent | 4 | 4 | 4 | 4 |
| Silica | 66.5 | 64.4 | 69.3 | 63.1 |
| Carbon black | 5 | 5 | 5 | 5 |
| Zinc oxide | 3 | 3 | 3 | 3 |
| Stearic acid | 1 | 1 | 1 | 1 |
| Anti-aging agent | 1 | 1 | 1 | 1 |
| Oil | 6 | 6 | 6 | 6 |
| Sulfur | 2 | 2 | 2 | 2 |
| Sulfur-containing vulcanization accelerator (CZ) | 1 | 1 | 1 | 1 |
| Vulcanization accelerator (DPG) | 0.5 | 0.5 | 0.5 | 0.5 |
| Mixture mass ratio (acid-modified polyolefin:silica) | 100:30 | 100:60 | 100:30 | 100:30 |
| Hardness (20° C.) | 116 | 115 | 103 | 125 |
| M100 | 115 | 114 | 105 | 121 |
| M300 | 108 | 103 | 102 | 107 |
| EB (elongation at break) | 108 | 104 | 105 | 106 |
| Impact resilience (60° C.) | 118 | 120 | 104 | 129 |
| tan δ (60° C.) | 77 | 77 | 95 | 62 |

In the components listed in Table 5, the components different from the components listed in Tables 1 to 4 above are as described below.

SBR: Nipol 1502 (manufactured by Zeon Corporation)

Mixtures E1 to E4: mixtures prepared with the methods described above

It was determined from the results shown in Table 5 above that Working Examples 12 to 17, in which a mixture (E) prepared by mixing the acid-modified polyolefin (D) and the silica (B) in advance at a prescribed mass ratio (100:5 to 100:60) was blended, all exhibited enhanced vulcanization properties such as hardness, modulus, and elongation at break as well as low heat build-up in comparison to Comparative Example 15 serving as a reference example.

REFERENCE SIGNS LIST

1 Bead portion
2 Sidewall portion
3 Tire tread portion
4 Carcass layer
5 Bead core
6 Bead filler
7 Belt layer
8 Rim cushion
9 Innerliner

The invention claimed is:

1. A rubber composition containing a diene rubber (A), a silica (B), a silane coupling agent (C), and an acid-modified polyolefin (D);
   the diene rubber (A) containing not less than 30 mass % of a styrene butadiene rubber and a butadiene rubber;
   the acid-modified polyolefin (D) is a maleic acid-modified ethylene/1-butene copolymer;
   a content of the silica (B) being from 5 to 150 parts by mass per 100 parts by mass of the diene rubber (A);
   a content of each of the silane coupling agent (C) and the acid-modified polyolefin (D) being not less than 1 part by mass per 100 parts by mass of the diene rubber (A); and
   a total content of the silane coupling agent (C) and the acid-modified polyolefin being from 5 to 30 parts by mass per 100 parts by mass of the diene rubber (A),
   wherein a part of the silica (B) and the acid-modified polyolefin (D) are contained as a mixture (E) prepared by mixing the part of the silica (B) and the acid-modified polyolefin (D) in advance,
   wherein at least a part of the silica (B) in the mixture (E) bonds to an acid-modified site of the acid-modified polyolefin (D).

2. The rubber composition according to claim 1, wherein a mass ratio of the acid-modified polyolefin (D) and the silica (B) in the mixture (E) is from 100:5 to 100:60.

3. The rubber composition according to claim 1, wherein a content of the mixture (E) is from 3 to 30 parts by mass per 100 parts by mass of the diene rubber (A).

4. A pneumatic tire comprising the rubber composition according to claim 1 in a structural member thereof.

* * * * *